US012592648B2

(12) United States Patent
Tamenaga et al.

(10) Patent No.: US 12,592,648 B2
(45) Date of Patent: Mar. 31, 2026

(54) POWER CONVERSION DEVICE

(71) Applicant: KABUSHIKI KAISHA TOYOTA JIDOSHOKKI, Aichi-ken (JP)

(72) Inventors: Haruki Tamenaga, Kariya (JP); Kohei Yoshida, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 211 days.

(21) Appl. No.: 18/648,637

(22) Filed: Apr. 29, 2024

(65) Prior Publication Data

US 2024/0380330 A1     Nov. 14, 2024

(30) Foreign Application Priority Data

May 12, 2023     (JP) ................................. 2023-079552

(51) Int. Cl.
| | | |
|---|---|---|
| *H02M 3/335* | (2006.01) | |
| *H02M 1/00* | (2006.01) | |
| *H02M 7/217* | (2006.01) | |

(52) U.S. Cl.
CPC ....... *H02M 3/33584* (2013.01); *H02M 1/007* (2021.05); *H02M 3/33573* (2021.05); *H02M 7/217* (2013.01)

(58) Field of Classification Search
CPC ............. H02M 3/33584; H02M 1/007; H02M 3/33573; H02M 7/217
See application file for complete search history.

(56) References Cited

U.S. PATENT DOCUMENTS

| | | | | |
|---|---|---|---|---|
| 12,463,545 | B2 * | 11/2025 | Wan | .................... H02M 1/0009 |
| 2020/0186046 | A1 | 6/2020 | Tanaka | |
| 2021/0305903 | A1 * | 9/2021 | Furukawa | ........... H02M 1/0006 |
| 2022/0021311 | A1 * | 1/2022 | Ishibashi | ........... H02M 3/33573 |

FOREIGN PATENT DOCUMENTS

JP          2020-092592 A          6/2020

* cited by examiner

*Primary Examiner* — Adolf D Berhane

(74) *Attorney, Agent, or Firm* — GREENBLUM & BERNSTEIN, P.L.C.

(57)          ABSTRACT

A control circuit performs at least one of a first phase shift control and a second phase shift control. The first phase shift control outputs a primary-side control signal so that a positive voltage is applied to a primary-side winding, and then outputs a secondary-side control signal so that a positive voltage is applied to a secondary-side winding when the voltage of the capacitor is higher than a battery voltage primary-side conversion value during activation of a bidirectional DC/DC. The second phase shift control outputs the secondary-side control signal so that a positive voltage is applied to the secondary-side winding, and then outputs the primary-side control signal so that a positive voltage is applied to the primary-side winding.

4 Claims, 2 Drawing Sheets

POWER CONVERSION DEVICE

BACKGROUND

1. Field

The following description relates to a power conversion device.

2. Description of Related Art

A power conversion device disclosed in Japanese Laid-Open Patent Publication No. 2020-92592 includes a bidirectional DC/DC converter and a capacitor arranged at an input end of the bidirectional DC/DC converter. The bidirectional DC/DC converter includes a transformer, a primary-side full-bridge circuit, and a secondary-side full-bridge circuit. The power conversion device charges, for example, a battery.

During activation of the bidirectional DC/DC converter, a difference between the voltage of the capacitor and a battery voltage primary-side conversion value may generate output power. The battery voltage primary-side conversion value is a value obtained by multiplying the voltage of the battery by the turn ratio of the transformer. When the output power is generated during the activation of the bidirectional DC/DC converter, the voltage of the capacitor fluctuates, resulting in an overvoltage or an overcurrent.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power conversion device includes a bidirectional DC/DC converter connected to a battery and a capacitor arranged at an input end of the bidirectional DC/DC converter. The bidirectional DC/DC converter includes a transformer including a primary-side winding and a secondary-side winding, a primary-side full-bridge circuit connected to the primary-side winding and including multiple primary-side switching elements, a secondary-side full-bridge circuit connected to the secondary-side winding and including multiple secondary-side switching elements, and a control circuit that outputs a primary-side control signal for switching on and off the primary-side switching elements and a secondary-side control signal for switching on and off the secondary-side switching elements, thereby converting an input voltage, input to the primary-side full-bridge circuit, into an output voltage, output from the secondary-side full-bridge circuit, and outputting the output voltage to the battery. A value obtained by multiplying a voltage of the battery by a turn ratio of the transformer is defined as a battery voltage primary-side conversion value. The control circuit is configured to perform, during activation of the bidirectional DC/DC, at least one of a first phase shift control that outputs the primary-side control signal so that a positive voltage is applied to the primary-side winding, and then outputs the secondary-side control signal so that a positive voltage is applied to the secondary-side winding when a voltage of the capacitor is higher than the battery voltage primary-side conversion value, and a second phase shift control that outputs the secondary-side control signal so that a positive voltage is applied to the secondary-side winding, and then outputs the primary-side control signal so that a positive voltage is applied to the primary-side winding.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A power conversion device according to one embodiment will now be described.

Figure 1:
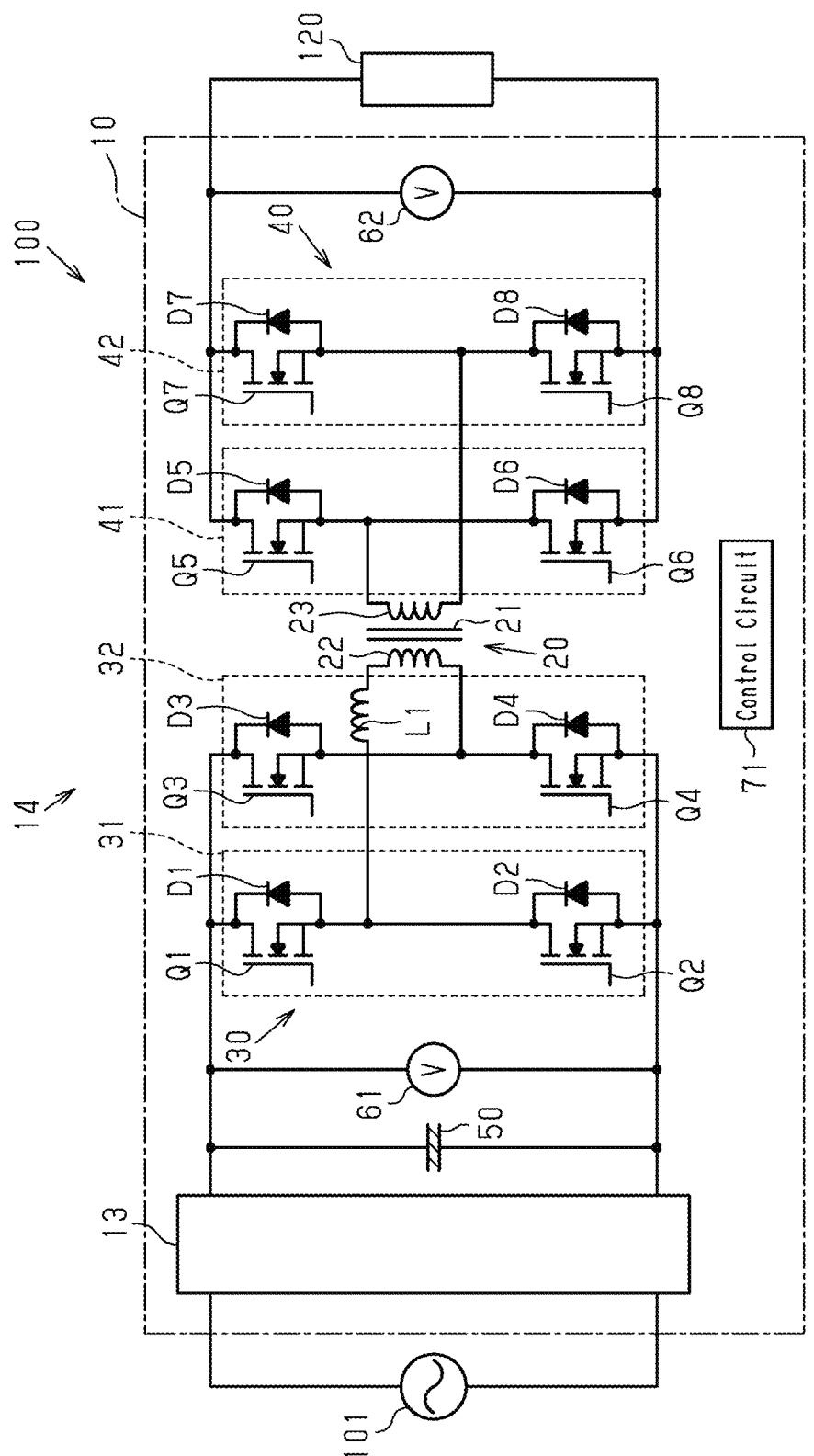
FIG. 1 is a circuit diagram of a power conversion device.

As shown in FIG. 1, a power supply system 100 includes a system power supply 101, a battery 120, and a power conversion device 10. The battery 120 is, for example, a rechargeable battery storing and discharging direct-current power. The rechargeable battery is, for example, a lithium-ion battery or a lead-acid battery.

Power Conversion Device

The power conversion device 10 includes an AC/DC converter 13 and a bidirectional DC/DC converter 14.

The AC/DC converter 13 is electrically connected to the system power supply 101. The AC/DC converter 13 converts alternating-current power, input from the system power supply 101, into direct-current power and outputs the direct-current power to the bidirectional DC/DC converter 14.

The bidirectional DC/DC converter 14 is a dual active bridge type DC/DC converter. The bidirectional DC/DC converter 14 is arranged between the AC/DC converter 13 and the battery 120. The bidirectional DC/DC converter 14 converts direct-current power, input from the AC/DC converter 13, and outputs the converted power to the battery 120. The bidirectional DC/DC converter 14 converts direct-current power, input from the battery 120, and outputs the converted power to the AC/DC converter 13.

The bidirectional DC/DC converter 14 includes a transformer 20. The transformer 20 is an insulated type. The transformer 20 includes a magnetic core 21, a primary-side winding 22, and a secondary-side winding 23. The primary-side winding 22 and the secondary-side winding 23 are wound around the core 21. The transformer 20 includes a reactor L1. The reactor L1 may be an element such as a choke coil, or may be a leakage inductance of the primary-side winding 22 and the secondary-side winding 23.

The bidirectional DC/DC converter 14 includes a primary-side full-bridge circuit 30. The primary-side full-bridge circuit 30 includes a first leg 31 and a second leg 32. The first leg 31 and the second leg 32 are connected in parallel to each other. The first leg 31 includes a first switching element Q1, a second switching element Q2, and diodes D1 and D2. The first switching element Q1 and the second switching element Q2 are connected in series to each other. The second leg 32 includes a third switching element Q3, a fourth switching element Q4, and diodes D3 and D4. The third switching element Q3 and the fourth switching element Q4 are connected in series to each other. The first switching element Q1 and the third switching element Q3 form an upper arm. The second switching element Q2 and the fourth switching element Q4 form a lower arm.

The first switching element Q1, the second switching element Q2, the third switching element Q3, and the fourth switching element Q4 are multiple primary-side switching elements Q1 to Q4. The primary-side switching elements Q1 to Q4 are, for example, n-type metal oxide semiconductor field effect transistors (MOSFETs). The primary-side switching elements Q1 to Q4 may be p-type MOSFETs, insulated gate bipolar transistors (IGBTs), or GaN-HEMTs.

The diodes D1 to D4 are respectively connected in parallel to the primary-side switching elements Q1 to Q4. The diodes D1 to D4 may be parasitic diodes or elements.

A connection node between the first switching element Q1 and the second switching element Q2 and a connection node between the third switching element Q3 and the fourth switching element Q4 are connected to the primary-side winding 22. Thus, the primary-side full-bridge circuit 30 is connected to the primary-side winding 22.

The bidirectional DC/DC converter 14 includes a secondary-side full-bridge circuit 40. The secondary-side full-bridge circuit 40 includes a third leg 41 and a fourth leg 42. The third leg 41 includes a fifth switching element Q5, a sixth switching element Q6, and diodes D5 and D6. The fifth switching element Q5 and the sixth switching element Q6 are connected in series to each other. The fourth leg 42 includes a seventh switching element Q7, an eighth switching element Q8, and diodes D7 and D8. The seventh switching element Q7 and the eighth switching element Q8 are connected in series to each other. The fifth switching element Q5 and the seventh switching element Q7 form an upper arm. The sixth switching element Q6 and the eighth switching element Q8 form a lower arm.

The fifth switching element Q5, the sixth switching element Q6, the seventh switching element Q7, and the eighth switching element Q8 are multiple secondary-side switching elements Q5 to Q8. The secondary-side switching elements Q5 to Q8 are, for example, n-type MOSFETs. The secondary-side switching elements Q5 to Q8 may be p-type MOSFETs, IGBTs, or GaN-HEMTs.

The diodes D5 to D8 are respectively connected in parallel to the secondary-side switching elements Q5 to Q8. The diodes D5 to D8 may be parasitic diodes or elements.

A connection node between the fifth switching element Q5 and the sixth switching element Q6 and a connection node between the seventh switching element Q7 and the eighth switching element Q8 are connected to the secondary-side winding 23. Thus, the secondary-side full-bridge circuit 40 is connected to the secondary-side winding 23.

The third leg 41 and the fourth leg 42 are connected to the battery 120 so as to be connected in parallel to each other. The secondary-side full-bridge circuit 40 is electrically connected to the battery 120. The output power of the secondary-side full-bridge circuit 40 is supplied to the battery 120. This allows the power conversion device 10 to charge the battery 120.

The power conversion device 10 includes an intermediate capacitor 50. The intermediate capacitor 50 is a link capacitor or a smoothing capacitor. The intermediate capacitor 50 is connected in parallel to the first leg 31 and the second leg 32. The intermediate capacitor 50 is arranged between the AC/DC converter 13 and the bidirectional DC/DC converter 14. The intermediate capacitor 50 is a capacitor arranged at an input end of the bidirectional DC/DC converter 14.

The power conversion device 10 includes a first voltage sensor 61. The first voltage sensor 61 detects a voltage VH of the intermediate capacitor 50.

The power conversion device 10 includes a second voltage sensor 62. The second voltage sensor 62 detects the voltage of the battery 120.

The power conversion device 10 includes a control circuit 71. The control circuit 71 includes a processor and a storage unit. The processor is, for example, a central processing unit (CPU), a graphics processing unit (GPU), or a digital signal processor (DSP). The storage unit includes a random-access memory (RAM) and a read-only memory (ROM). The storage unit stores program codes or instructions configured to cause the processor to execute processes. The storage unit, which is a computer-readable medium, includes any type of medium that is accessible by a general-purpose computer or a dedicated computer. The control circuit 71 may be configured by a hardware circuit such as an application specific integrated circuit (ASIC) or a field programmable gate array (FPGA). The control circuit 71, which is processing circuitry, may include one or more processors that operate according to a computer program, one or more hardware circuits such as an ASIC or an FPGA, or a combination thereof.

The control circuit 71 controls the power conversion device 10. The control circuit 71 outputs a primary-side control signal to the primary-side switching elements Q1 to Q4 when switching on and off the primary-side switching elements Q1 to Q4. The control circuit 71 outputs a secondary-side control signal to the secondary-side switching elements Q5 to Q8 when switching on and off the secondary-side switching elements Q5 to Q8.

When the system power supply 101 is electrically connected to the AC/DC converter 13, the control circuit 71 converts alternating-current power, input from the system power supply 101 to the power conversion device 10, into direct-current power and outputs the direct-current power to the battery 120. More specifically, the control circuit 71 operates the AC/DC converter 13 to input direct-current power to the bidirectional DC/DC converter 14. The control circuit 71 performs switching operations with the primary-side switching elements Q1 to Q4 by outputting the primary-side control signal to the primary-side switching elements Q1 to Q4. The control circuit 71 performs switching operations with the secondary-side switching elements Q5 to Q8 by outputting the secondary-side control signal to the secondary-side switching elements Q5 to Q8. This converts an input voltage, input to the primary-side full-bridge circuit 30, into an output voltage, output from the secondary-side full-bridge circuit 40, and outputs the output voltage to the battery 120.

The primary-side full-bridge circuit 30 switches between a first operation in which the first switching element Q1 and the fourth switching element Q4 are simultaneously on and a second operation in which the second switching element Q2 and the third switching element Q3 are simultaneously on. Thus, the primary-side control signal is output when switching between the first operation and the second operation.

The secondary-side full-bridge circuit 40 switches between a third operation in which the fifth switching element Q5 and the eighth switching element Q8 are simultaneously on and a fourth operation in which the sixth switching element Q6 and the seventh switching element Q7 are simultaneously on. Thus, the secondary-side control signal is output when switching between the third operation and the fourth operation.

When the first operation is performed in the primary-side full-bridge circuit 30, the third operation is performed in the secondary-side full-bridge circuit 40. When the second operation is performed in the primary-side full-bridge circuit 30, the fourth operation is performed in the secondary-side full-bridge circuit 40.

Activation control performed by the control circuit 71 during activation of the bidirectional DC/DC converter 14 will now be described.

Activation Control

Figure 2:
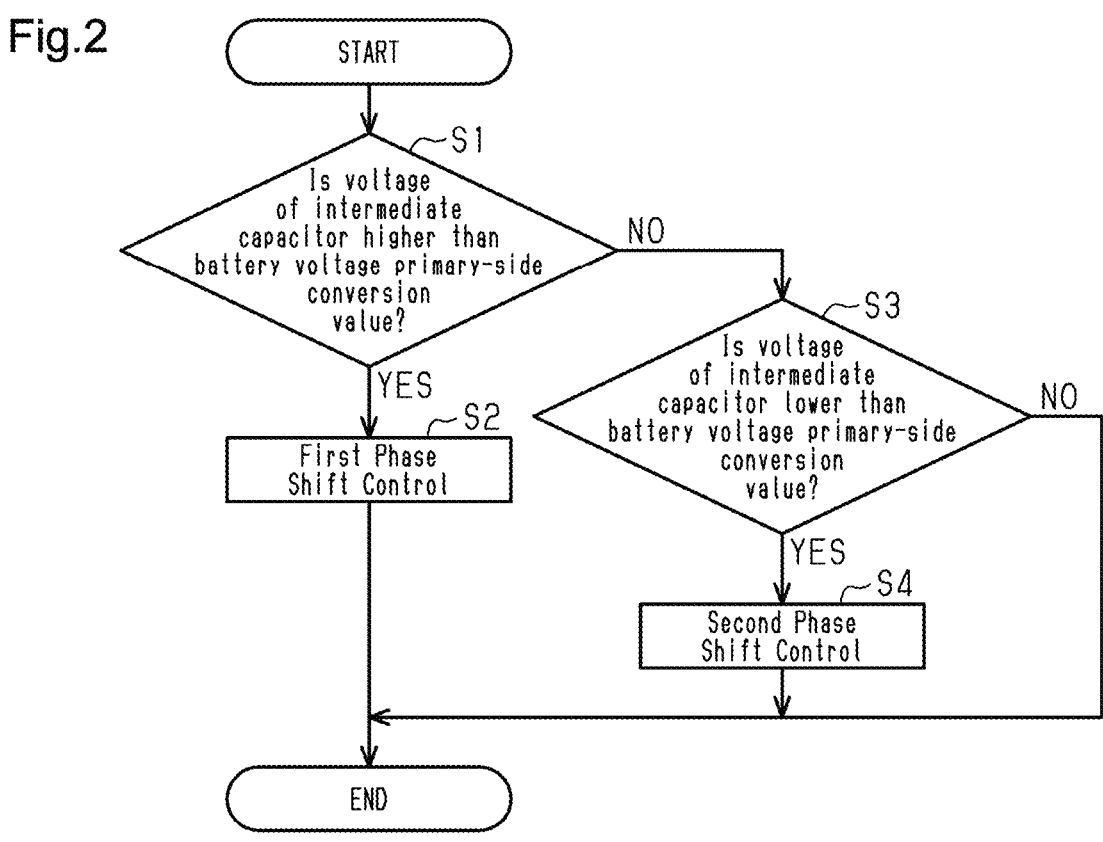
FIG. 2 is a flowchart showing activation control.

As shown in FIG. 2, in step S1, the control circuit 71 determines whether the voltage VH of the intermediate capacitor 50 is higher than a battery voltage primary-side conversion value VCHG during activation of the bidirectional DC/DC converter 14. The voltage VH of the intermediate capacitor 50 is obtained from the first voltage sensor 61. The battery voltage primary-side conversion value VCHG is a value obtained by multiplying the voltage of the battery 120 by the turn ratio of the transformer 20. The voltage of the battery 120 is obtained from the second voltage sensor 62. The turn ratio of the transformer 20 is obtained by dividing the number of turns of the primary-side winding 22 by the number of turns of the secondary-side winding 23. The turn ratio of the transformer 20 is determined in advance. When the determination result in step S1 is affirmative, the control circuit 71 performs a process in step S2.

In step S2, the control circuit 71 performs first phase shift control. The first phase shift control outputs the primary-side control signal so that a positive voltage is applied to the primary-side winding 22, and then outputs the secondary-side control signal so that a positive voltage is applied to the secondary-side winding 23.

The first phase shift control retards the phase of the secondary-side control signal with respect to the primary-side control signal. Specifically, after the first operation is performed in the primary-side full-bridge circuit 30, the third operation is performed in the secondary-side full-bridge circuit 40. After the second operation is performed in the primary-side full-bridge circuit 30, the fourth operation is performed in the secondary-side full-bridge circuit 40.

A phase shift amount $\theta_{ini}$ (°) when the first phase shift control is performed may be a fixed value or a variable value. In one example, the phase shift amount $\theta_{ini}$ is expressed as Equation (1). The phase shift amount $\theta_{ini}$ when the first phase shift control is performed corresponds to a duration from a transmission of the primary-side control signal to a transmission of the secondary-side control signal. Equation (1) is derived through circuit analysis.

Equation 1

$$\theta_{ini} = -DT + \frac{2C \cdot VH \cdot L}{(VH - VCHG) \cdot T_{sw}} \tag{1}$$

In Equation 1, DT represents a dead time. C represents the parasitic capacitance of the switching elements Q1 to Q8. L represents the leakage inductance of the transformer 20. $T_{sw}$ represents a switching cycle.

When the determination result in step S1 is negative, the control circuit 71 performs determination in step S3.

In step S3, the control circuit 71 determines whether the voltage VH of the intermediate capacitor 50 is lower than the battery voltage primary-side conversion value VCHG during activation of the bidirectional DC/DC converter 14. When the determination result in step S3 is affirmative, the control circuit 71 performs a process in step S4.

In step S4, the control circuit 71 performs second phase shift control. The second phase shift control outputs the secondary-side control signal so that a positive voltage is applied to the secondary-side winding 23, and then outputs the primary-side control signal so that a positive voltage is applied to the primary-side winding 22.

The second phase shift control advances the phase of the secondary-side control signal with respect to the primary-side control signal. Specifically, after the third operation is performed in the secondary-side full-bridge circuit 40, the first operation is performed in the primary-side full-bridge circuit 30. After the fourth operation is performed in the secondary-side full-bridge circuit 40, the second operation is performed in the primary-side full-bridge circuit 30.

A phase shift amount $\theta_{ini}$ (°) when the second phase shift control is performed may be a fixed value or a variable value. In one example, the phase shift amount $\theta_{ini}$ is expressed as Equation (2). The phase shift amount $\theta_{ini}$ when the second phase shift control is performed corresponds to a duration from a transmission of the primary-side control signal to a transmission of the secondary-side control signal. Equation (2) is derived through circuit analysis.

Equation 2

$$\theta_{ini} = DT - \frac{2C \cdot VH \cdot L}{(VCHG - VH) \cdot T_{sw}} \tag{2}$$

When the determination result in step S3 is negative, the control circuit 71 performs neither the first phase shift control nor the second phase shift control. In this case, for example, the control circuit 71 outputs the primary-side control signal and the secondary-side control signal so that a positive voltage is applied to the primary-side winding 22 and the secondary-side winding 23 at the same time.

Operation in Present Embodiment

An ideal value of an output power P of the bidirectional DC/DC converter 14 is expressed as Equation (3).

Equation 3

$$P = \frac{VH \cdot VCHG}{\omega \cdot L} \cdot \theta \cdot \left(1 - \frac{\theta}{\pi}\right) \tag{3}$$

7 8

In Equation (3), ω represents 2π×switching frequency, and θ represents a phase shift amount.

However, the output power P of the bidirectional DC/DC converter 14 may not always be ideal due to the dead time or an input/output voltage. Thus, the output power P may not be 0 when the primary-side control signal and the secondary-side control signal are output so that a positive voltage is applied to the primary-side winding 22 and the secondary-side winding 23 at the same time.

When the output power P is not 0 and the voltage VH of the intermediate capacitor 50 is higher than the battery voltage primary-side conversion value VCHG, an overcurrent may occur. When the output power P is not 0 and the voltage VH of the intermediate capacitor 50 is lower than the battery voltage primary-side conversion value VCHG, an overvoltage may occur.

Figure 3:
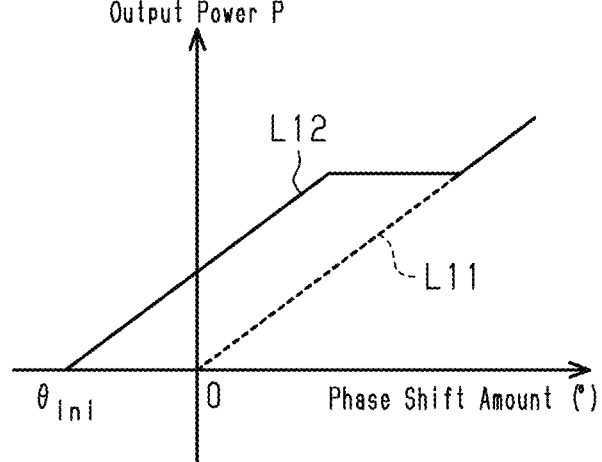
FIG. 3 is a graph showing the relationship between a phase shift amount and output power.

FIG. 3 shows the relationship between the phase shift amount and the output power P. A line L11 indicates the characteristics of the ideal output power P. A line L12 indicates the characteristics of an actual output power P. The relationship between the phase shift amount and the output power P may vary in accordance with various factors such as the dead time, an input/output power, and the battery voltage primary-side conversion value VCHG. The relationship between the phase shift amount and the output power P indicated by the line L12 in FIG. 3 is an example in which the factors are set to specific values.

As shown in FIG. 3, when the phase shift amount is 0, the actual output power P is not 0. In the example in FIG. 3, when the phase shift amount is greater than or equal to $\theta_{ini}$ and less than 0, the output power P is reduced as compared to when the phase shift amount is 0.

Advantages of Present Embodiment (1) When the voltage VH of the intermediate capacitor 50 is higher than the battery voltage primary-side conversion value VCHG, the control circuit 71 performs the first phase shift control. When the voltage VH of the intermediate capacitor 50 is lower than the battery voltage primary-side conversion value VCHG, the control circuit 71 performs the second phase shift control. This reduces the output power P during activation of the bidirectional DC/DC converter 14.

(2) The power conversion device 10 includes the intermediate capacitor 50 between the AC/DC converter 13 and the bidirectional DC/DC converter 14. In this case, when a relatively great output power P is generated during activation of the bidirectional DC/DC converter 14, the voltage of the intermediate capacitor 50 fluctuates and an overvoltage or an overcurrent is generated. However, in the present embodiment, since the output power P is reduced during the activation of the bidirectional DC/DC converter 14, the voltage fluctuation of the intermediate capacitor 50 is suppressed.

Modifications

The present embodiment may be modified as follows. The present embodiment and the following modifications can be combined as long as the combined modifications remain technically consistent with each other.

The control circuit 71 may perform only one of the first phase shift control and the second phase shift control. For example, when the voltage VH of the intermediate capacitor 50 is always higher than the battery voltage primary-side conversion value VCHG, the control circuit 71 may perform only the first phase shift control.

The power conversion device does not need to include the AC/DC converter 13. In this case, the capacitor connected to the input end of the bidirectional DC/DC converter 14 is an input capacitor.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power conversion device, comprising:
   a bidirectional DC/DC converter connected to a battery; and
   a capacitor arranged at an input end of the bidirectional DC/DC converter, wherein
   the bidirectional DC/DC converter includes:
      a transformer including a primary-side winding and a secondary-side winding;
      a primary-side full-bridge circuit connected to the primary-side winding and including multiple primary-side switching elements;
      a secondary-side full-bridge circuit connected to the secondary-side winding and including multiple secondary-side switching elements; and
      a control circuit that outputs a primary-side control signal for switching on and off the primary-side switching elements and a secondary-side control signal for switching on and off the secondary-side switching elements, thereby converting an input voltage, input to the primary-side full-bridge circuit, into an output voltage, output from the secondary-side full-bridge circuit, and outputting the output voltage to the battery,
   a value obtained by multiplying a voltage of the battery by a turn ratio of the transformer is defined as a battery voltage primary-side conversion value, and
   the control circuit is configured to perform, during activation of the bidirectional DC/DC, at least one of a first phase shift control that outputs the primary-side control signal so that a positive voltage is applied to the primary-side winding, and then outputs the secondary-side control signal so that a positive voltage is applied to the secondary-side winding when a voltage of the capacitor is higher than the battery voltage primary-side conversion value, and a second phase shift control that outputs the secondary-side control signal so that a positive voltage is applied to the secondary-side winding, and then outputs the primary-side control signal so that a positive voltage is applied to the primary-side winding.

2. The power conversion device according to claim 1, further comprising:
   an AC/DC converter that converts alternating-current power into direct-current power and outputs the direct-current power to the bidirectional DC/DC converter.

3. The power conversion device according to claim 1, wherein the control circuit is configured to perform the first phase shift control when the voltage of the capacitor is higher than the battery voltage primary-side conversion value, and to perform the second phase shift control when the voltage of the capacitor is lower than the battery voltage primary-side conversion value.

4. The power conversion device according to claim 2, wherein the capacitor is arranged between the AC/DC converter and the bidirectional DC/DC converter.

* * * * *